(12) United States Patent
Aliaga et al.

(10) Patent No.: US 10,124,416 B2
(45) Date of Patent: Nov. 13, 2018

(54) DRILLING TOOL AND DEVICE FOR DRILLING WITH CRYOGENIC COOLING AND METHOD FOR DRILLING A STACK OF HETEROGENEOUS MATERIALS

(71) Applicant: Airbus SAS, Blagnac (FR)

(72) Inventors: Daniel Aliaga, Aubervilliers (FR); Dominique Schuster, Saint Germain en Laye (FR); Fernand Vinhas, Saint Germain en Laye (FR); Guillaume Abrivard, Amiens (FR)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 15/348,135

(22) Filed: Nov. 10, 2016

(65) Prior Publication Data
US 2017/0056983 A1  Mar. 2, 2017

Related U.S. Application Data

(62) Division of application No. 14/430,164, filed as application No. PCT/EP2013/069506 on Sep. 19, 2013.

(30) Foreign Application Priority Data

Sep. 21, 2012  (FR) ..................................... 12 58901

(51) Int. Cl.
*B23B 35/00* (2006.01)
*B23B 51/06* (2006.01)
(Continued)

(52) U.S. Cl.
CPC .......... *B23B 51/0493* (2013.01); *B23B 35/00* (2013.01); *B23Q 11/1023* (2013.01);
(Continued)

(58) Field of Classification Search
CPC .......... B23B 2222/88; B23B 2226/275; B23B 2226/315; B23B 2228/36; B23B 2250/12;
(Continued)

(56) References Cited

U.S. PATENT DOCUMENTS 3,096,668 A * 7/1963 Maynard ................. B23B 51/06
408/59
5,006,021 A 4/1991 Wheetley
(Continued)

FOREIGN PATENT DOCUMENTS

DE 202 11 592 U1 4/2004
GB 2 480 011 A 11/2011

*Primary Examiner* — Sunil K Singh
*Assistant Examiner* — Nicole N Ramos
(74) *Attorney, Agent, or Firm* — Greer, Burns & Crain, Ltd.

(57) ABSTRACT

A drill bit having an interior canal for liquid nitrogen to pass longitudinally through the body of the drill bit. The canal has, on the side of a cutting edge of the drill bit, at least one liquid nitrogen ejection duct that opens near the cutting edge which is formed by an insert made with polycrystalline diamond fixed to the body of the drill bit. A device for drilling a metal-composite stack includes the drill bit, a liquid nitrogen production unit and a distribution network to distribute the liquid nitrogen. The device drills through a metal-composite stack in a single pass of the drill bit. The liquid nitrogen at cryogenic temperature is conveyed close to the cutting edge, at least while the cutting edge is in contact with the metallic material.

5 Claims, 2 Drawing Sheets

(51) Int. Cl.
*B23B 51/04* (2006.01)
*B23Q 11/10* (2006.01)

(52) U.S. Cl.
CPC ...... *B23Q 11/1053* (2013.01); *B23Q 11/1061* (2013.01); *B23B 2222/88* (2013.01); *B23B 2226/275* (2013.01); *B23B 2226/315* (2013.01); *B23B 2228/36* (2013.01); *B23B 2250/12* (2013.01); *Y10T 408/03* (2015.01); *Y10T 408/45* (2015.01)

(58) Field of Classification Search
CPC ..... B23B 35/00; B23B 51/0493; B23B 51/06; B23B 27/10; B23Q 11/1023; B23Q 11/1053; B23Q 11/1061; B23Q 11/1015; Y10T 408/45; Y10T 408/44; Y10T 408/455
See application file for complete search history.

(56) References Cited

U.S. PATENT DOCUMENTS

| | | | | |
|---|---|---|---|---|
| 5,415,500 | A  * | 5/1995 | Delangis | B23B 35/00 408/1 R |
| 5,595,462 | A  * | 1/1997 | Hensley | B23Q 1/0036 408/1 R |
| 7,771,145 | B2 * | 8/2010 | Katoh | B23B 41/02 408/1 R |
| 2004/0234350 | A1 | 11/2004 | Jager et al. | |
| 2009/0067943 | A1* | 3/2009 | Capone | B23B 51/02 408/230 |
| 2010/0272529 | A1* | 10/2010 | Rozzi | B23C 5/207 408/56 |
| 2010/0272530 | A1* | 10/2010 | Rozzi | B23Q 11/1015 408/56 |
| 2012/0093604 | A1* | 4/2012 | Rozzi | B23Q 11/1015 409/136 |

* cited by examiner

DRILLING TOOL AND DEVICE FOR DRILLING WITH CRYOGENIC COOLING AND METHOD FOR DRILLING A STACK OF HETEROGENEOUS MATERIALS

RELATED APPLICATIONS

This application is a divisional of application Ser. No. 14/430,164 filed Mar. 21, 2015, which is a § 371 application from PCT/EP2013/069506 filed Sep. 19, 2013, which claims priority from French Patent Application No. 12 58901 filed Sep. 21, 2012, each of which is herein incorporated by reference in its entirety.

TECHNICAL FIELD OF THE INVENTION

The present invention belongs to the field of tools and devices intended for drilling materials.

In particular, the invention relates to a drill bit and a drilling device for drilling into stacks of metal materials and composite materials such as those produced during the assembly of aircraft structures.

BACKGROUND OF THE INVENTION

The production of structures having high mechanical performances and weights that are as low as possible leads the designers of the structures to use titanium-based metal alloys and composite materials comprising carbon, glass or aramid fibers held in a hardened organic matrix, in general a polymer resin.

When these parts must be drilled or reamed in order to produce assemblies, the drilling conditions must be adapted as a function of the material machined.

Thus, titanium alloys, the thermal conductivity of which is low, around ten times lower than that of an aluminum, are generally drilled using tools having substrates made of tungsten carbide (WC) with cobalt binder that withstand temperatures that may reach 1000° C. during the drilling using an oily lubricant. These high temperatures are the cause of accelerated wear of the drill bits used for the drilling.

On the other hand, composite materials, which have high abrasive characteristics, in particular in the case of carbon fibers, which damage the drilling tool by abrasion, are generally dry drilled with tools made of tungsten carbide with diamond or diamond-coated inserts, preferably polycrystalline diamond (PCD) inserts.

Owing to these very different drilling conditions and to the need to use drill bits specific to each of these conditions, the drilling of a stack of parts made of materials of a titanium alloy and of a carbon fiber composite proves difficult.

In particular, owing to the fact that composite materials, for the most common ones, should not locally exceed a glass transition temperature of the resin, in the case of the most common ones a temperature of the order of 180° C., and that the tools for drilling composite materials are not suitable for drilling titanium alloys due to the temperature reached which would damage the tool, the graphitization of the diamond taking place at around 800° C., the one-step drilling of a stack of these various materials is in general carried out with a tool suitable for drilling titanium while increasing as much as necessary the amount of lubricant in order to limit the increase in temperature.

The drilling of the part of the stack made of composite material is then penalized by an accelerated wear of the drilling tool via abrasion.

OBJECT AND SUMMARY OF THE INVENTION

The invention provides a solution to these various problems by means of a drill bit, equipped for drilling a stack comprising at least one layer of a metal material, for example a titanium-based alloy, and at least one layer of a composite material comprising fibers held in a hardened matrix, for example carbon fibers in a cured organic resin matrix. The drill bit comprises one liquid nitrogen flow channel, at least, inside the drill bit, that passes through a body of the drill bit along an axis which for example corresponds substantially to a rotational axis of the drill bit during a drilling operation, the channel opening for example near a tail end via which the drill bit is intended to be held on a rotary driving machine, the channel comprising near at least one cutting edge of the drill bit, which edge is located at an end opposite the tail end along a length of the drill bit, at least one liquid nitrogen ejection duct opening close to the at least one cutting edge, the at least one cutting edge being formed by an insert made with polycrystalline diamond and attached to the body of the drill bit.

The polycrystalline diamond tipped drill bit thus formed makes it possible, by being combined with means for distributing cryogenic liquid nitrogen into the channel, to drill metal materials releasing a large amount of thermal energy that is difficult to remove without causing excessive heating of the tool that is capable of very rapidly damaging the tool.

The customary wear via abrasion of the composites is slowed down by the use of PCDs.

In one embodiment, the drill bit comprises a plurality of cutting edges and each cutting edge comprises at least one liquid nitrogen ejection duct that opens close to the cutting edge in question so that the liquid nitrogen is concentrated toward the corresponding cutting edge during a drilling operation.

In one embodiment, each cutting edge comprises at least one liquid nitrogen ejection duct that opens on a cutting face of this cutting edge and at least one liquid nitrogen ejection duct that opens on a wear face of this cutting edge which makes it possible both to increase the flow rate of liquid nitrogen cooling the edge in question and also to spread the liquid nitrogen that provides the cooling of this cutting edge over the two faces of the insert forming the cutting edge.

The liquid nitrogen flow channel is for example axial which makes it possible, via a straight channel having a diameter that is as wide as possible, to reduce the pressure drops and to facilitate the circulation of the liquid nitrogen.

In order to improve the effectiveness of the liquid nitrogen cooling by limiting the thermal losses before the liquid nitrogen arrives close to the cutting edge(s), the channel of the drill bit is insulated internally by a layer of a thermally insulating material over at least one portion of a length of the channel.

In one embodiment, the channel of the drill bit comprises an enlarged cross section that forms a reservoir in a region of the body located near the cutting edge(s). Thus, during operation of the device a reservoir of liquid nitrogen is formed that provides an increased cooling mass close to the heating region and a buffer volume of liquid nitrogen in the event of failure in the supply of liquid nitrogen or in the event of premature cut-off of the liquid nitrogen at the end of the drilling of a metal material.

Advantageously, the liquid nitrogen flow channel that passes through the body and the liquid nitrogen ejection ducts are sized so as to provide a flow rate of liquid nitrogen, substantially at the temperature of 77 kelvin, sufficient for keeping the cutting edge(s) at a temperature below a temperature for converting the polycrystalline diamond of the insert(s) into graphite when the drill bit is used for drilling into a titanium-based alloy according to the intended cutting conditions so that the one-step drilling of a stack comprising a titanium-based alloy is industrially possible.

A drilling device, for drilling a stack comprising at least one layer of a metal material and at least one layer of a composite material comprising fibers held in a hardened matrix, comprises a drill bit as claimed in one of the preceding claims, a liquid nitrogen production unit and a system for distributing liquid nitrogen from said production unit to the drill bit so that the device ensures the cooling of the drill bit when drilling is in progress.

The invention also relates to a drilling method, suitable for drilling a stack comprising at least one layer of a metal material, for example a titanium-based alloy, and at least one layer of a composite material comprising fibers held in a hardened matrix, for example carbon fibers in a cured organic resin matrix, in which drilling is carried out in one pass of a drill bit comprising at least one cutting edge, formed by an insert made with polycrystalline diamond and attached to a body of the drill bit, and in which liquid nitrogen at cryogenic temperature is transported close to the cutting edge by a channel of the drill bit, opening via at least one ejection duct close to the cutting edge, when the cutting edge formed by the insert made with polycrystalline diamond is in contact with the metal material during the drilling of the stack.

The drilling of the stack comprising metal materials with a tool suitable for drilling composite materials is thus made possible by the method.

In order to ensure sufficient cooling of the cutting edges and to enable relatively rapid drilling of metal materials, the liquid nitrogen is sent close to the cutting edge simultaneously on a cutting face of the cutting edge and on a wear face of the cutting edge, and this being the case for each cutting edge.

In order to limit the liquid nitrogen consumption of a drilling operation if necessary, the liquid nitrogen is sent into the channel as a function of a measured or estimated position of the drill bit with respect to the stack when the position determines that the drilling of the metal material is in progress or likely, it being possible for such a condition to be obtained from a knowledge of the characteristics of the drilled stack and for measuring or estimating the position of the end of the drill bit with respect to a frame of reference of the stack in the course of drilling.

In order to ensure a satisfactory service life of the drill bit used for drilling into metals having poor heat conduction, the liquid nitrogen is transported with a flow rate sufficient for keeping the temperature of the drill bit below a temperature for converting the diamond into graphite when said drill bit drills a titanium-based metal alloy.

BRIEF DESCRIPTION OF THE DRAWINGS

The present invention is described with reference to the figures which, nonlimitingly, schematically represent.

The figures are not to scale, both among the figures and among the parts of one and the same figure, in order to facilitate the understanding thereof and similar parts of different figures bear identical references.

DETAILED DESCRIPTION OF THE EMBODIMENTS

Figure 1:
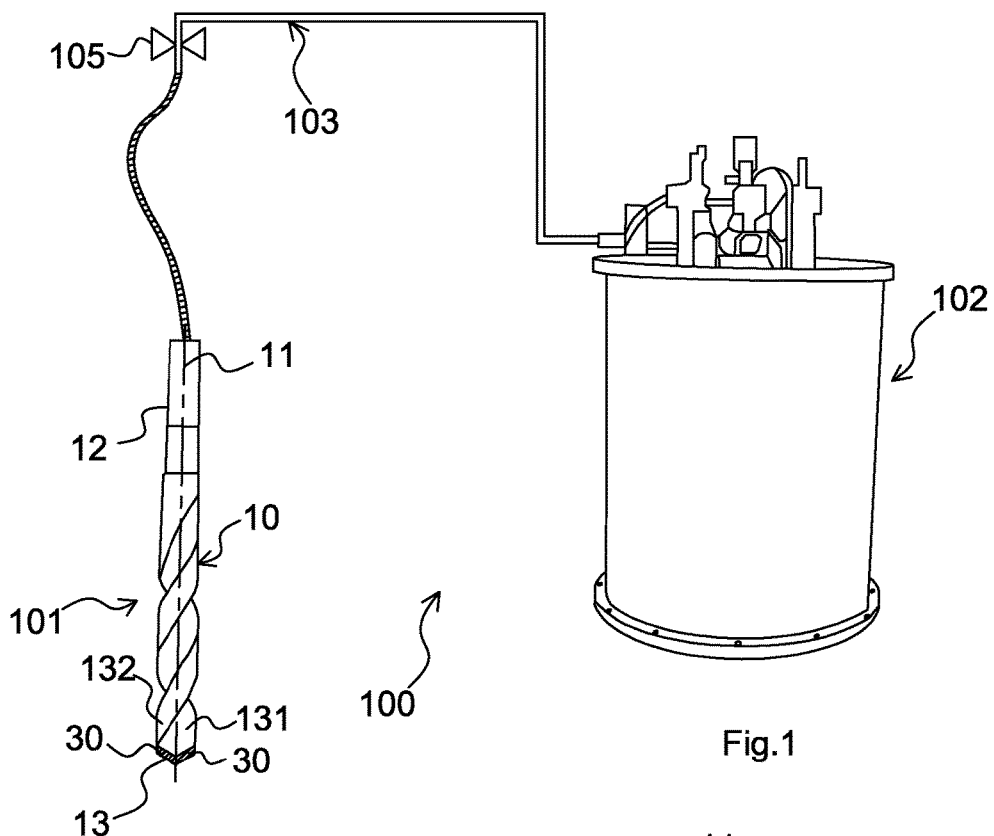
FIG. 1: a drilling device according to the invention.

The device 100 represented in FIG. 1 comprises a drill bit 101, a unit 102 for producing low-temperature nitrogen in the liquid state and a system 103 for distributing liquid nitrogen from the production unit 102 to the drill bit 101.

The production unit 102 consists of any means that can produce liquid nitrogen substantially at ambient pressure, that is to say cryogenic nitrogen at a temperature of the order of 77 kelvin, with the flow rate desired as a function of the operating conditions of the drill bit 101. In a simple embodiment, the production unit 102 consists of a reinforced thermally insulated tank of cryostat type containing a stock of liquid nitrogen. In another embodiment, the production unit consists of an apparatus for producing liquid nitrogen by condensation of atmospheric nitrogen, for example using a Stirling cycle machine.

The distribution system 103 consists of any means capable of conveying the liquid nitrogen from the production unit 102 to the drill bit 101 and of controlling the flow rate thereof.

In particular, the distribution system 103 comprises at least one liquid nitrogen delivery duct, a portion of said duct being advantageously incorporated into a rotary driving machine, not represented in FIG. 1, which rotates the drill bit 101.

Such a rotary driving machine is for example a fixed drilling machine, to which parts forming a stack that has to be drilled are clamped, or a portable drilling unit used at the assembling stations of large structural assemblies, a station for joining an aircraft wing to the fuselage for example.

The term "stack" will be used here generically to denote a region of a structure comprising two or more parts comprising different materials, and/or two or more different materials, including at least one metal material and at least one composite material, in the path of a drilling operation to be carried out.

The drill bit 101 comprises a body 10 of overall cylindrical shape having an axis 11 corresponding to a longitudinal axis of the drill bit about which said drill bit is rotated during drilling operations.

A first end of the body 10 forms a tail end 12 via which the drill bit is attached to a rotary driving machine, where appropriate by means of a mounting cone not represented, and a second end of the body, opposite on the body 10 to the first end, comprises one or more cutting edges 13 as illustrated in the detail a) of FIG. 1 of a drill bit with two cutting edges.

Figure 2:
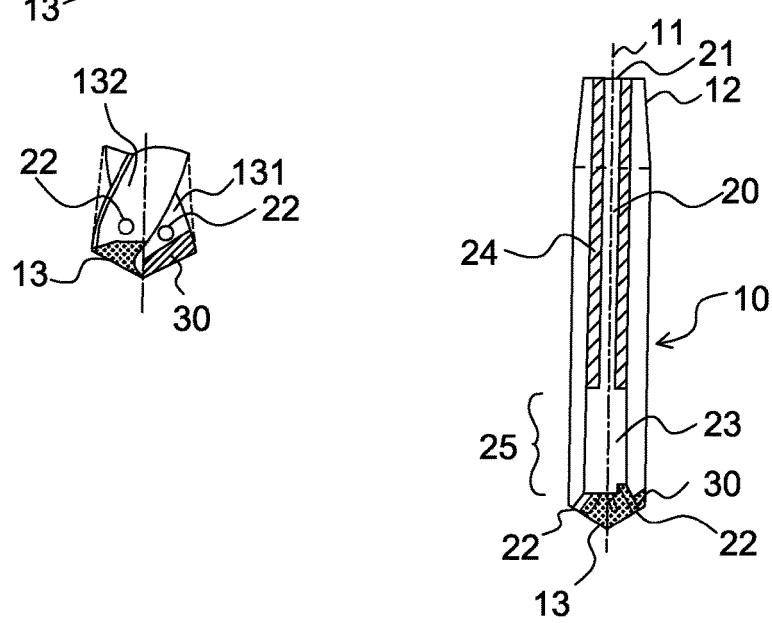
FIG. 2: along a longitudinal cross section, an example of a drill bit used in the drilling device of FIG. 1

As illustrated in FIG. 2, schematically representing the drill bit in axial cross section, a channel 20 inside the body 10 passes through said body along a substantially axial length and opens, on the one hand, in a region of the tail end 12 at at least one liquid nitrogen inlet opening 21 and on the other hand, close to the cutting edge(s) 13 at the nitrogen ejection ducts 22.

In one preferred embodiment, each cutting edge 13 is associated with at least one ejection duct opening onto a cutting face 131 of said cutting edge and with at least one ejection duct opening onto a wear face 132 of said cutting edge, detail a) of FIG. 1.

Diamond inserts 30, in practice inserts made with industrially produced polycrystalline diamond (PCD), are attached to the body 10 so as to form the cutting edges 13.

In one embodiment, the liquid nitrogen inlet opening 21 is arranged on one face of the first end of the drill bit 10 substantially centered on the axis 11.

In one embodiment, the channel 20 has an enlarged cross section over one portion at least of a length of said channel so as to form a reservoir 23.

In one embodiment, the channel 20 comprises a thermally insulating coating 24, for example a sheath made of an alloy having a high content of chromium and nickel, such as Invar®, or a non-metallic material, for example cork or a polymer material such as polytetrafluorocarbon, so that the material constituting the body 10 is not in direct contact with the liquid nitrogen passing through said channel and limits thermal exchanges at the body 10. In the exemplary embodiment illustrated, the thermally insulating coating 24 only affects a portion of the channel 20 from the inlet opening 21 to an uninsulated region 25, it being possible for said region for example to correspond to the reservoir 23 when the drill bit is provided with such a reservoir.

A transverse cross section of the channel 20 is in practice as big as possible, without however weakening the mechanical strength of the drill bit 101 to a point that could result in rupture of said drill bit under forces expected during a drilling operation, in order to favor a high flow rate of liquid nitrogen passing through the body 10 in order to keep the temperature at the cutting edges at an acceptable value for the drill bit. The transverse cross section of the channel 20, in the same way as a cross section of the reservoir 25, limited by the depth of the flutes of the drill bit, is for example determined by drill bit mechanical strength calculations.

Figure 3:
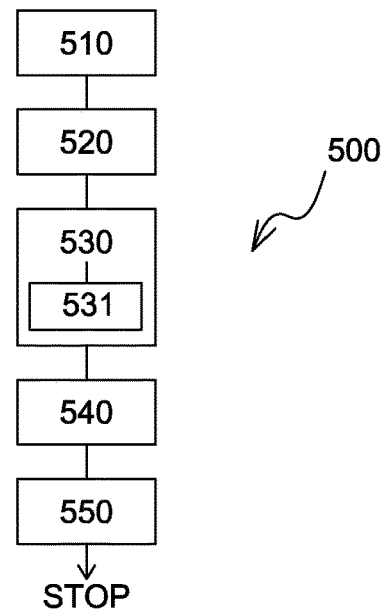
FIG. 3: the steps of a method for drilling a stack using the drilling device of FIG. 1.

The advantages of the device 100 which has just been described will be better understood from the description of the drilling method 500, FIG. 3, using said device.

Figure 4:
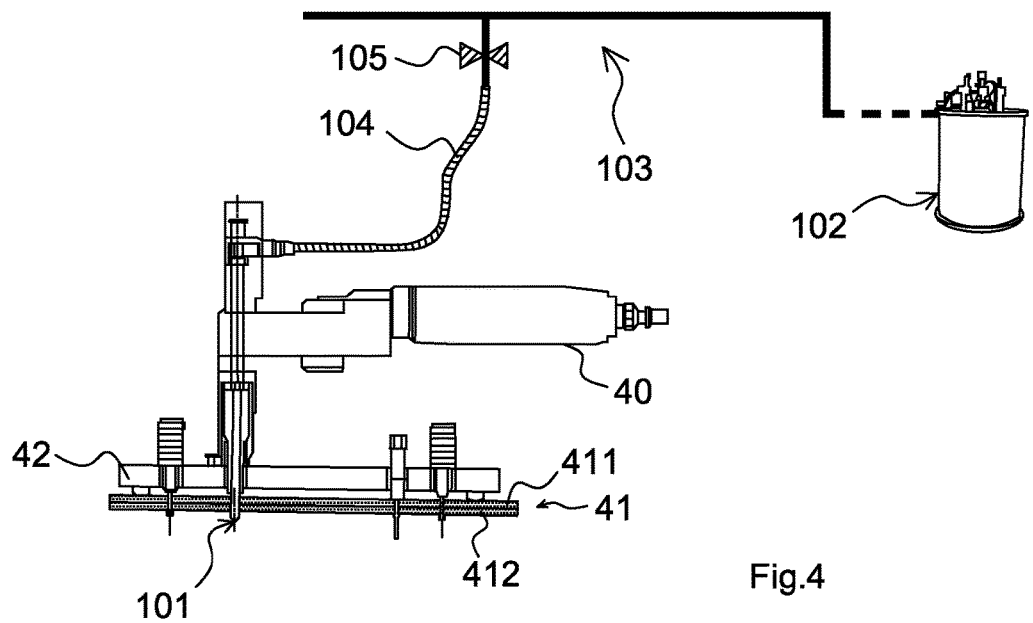
FIG. 4: an example of fitting a drilling device to a portable drilling unit in position on a drilling grid.

In a first step 510, the device 100 is mounted 510 on a drilling unit 40, for example an independent drilling unit as represented in FIG. 4, that can be transported to an assembling station and moved to various locations where drilling must be carried out through a stack 41 of parts 411, 412 comprising metal materials, in particular based on titanium such as an alloy Ti6A14V, and composite materials with mineral fibers, in particular carbon fibers. In practice, the drill bit 101 is attached to a head for rotating and advancing the drilling unit suitable for enabling a flow of liquid nitrogen to the inlet opening 21 of the drill bit and the drilling unit 40 is connected to the distribution system 103 for example by means of a flexible connector 104 in order to deliver the liquid nitrogen.

At the end of this first step, the device 100 and the drilling unit 40 form a cryogenic drilling unit comprising a source of liquid nitrogen 102 at a pressure close to ambient pressure, means for rotating, where appropriate for advancing the drilling, a drill bit in accordance with the drill bit 101 described above, and the liquid nitrogen distribution system 103 transporting liquid nitrogen from the tank to the drill bit, passing through a head of the drilling unit via which the drill bit is attached to said drilling unit.

In a second step 520, the drilling unit 40 and the stack 41 through which drilling must be carried out, are clamped in the desired relative position, for example by means of a drilling grid 42.

In a third step 530, the drilling is initiated, that is to say that the drill bit 101 is rotated and that an advance, that is to say an axial displacement movement in the direction of the assembly to be drilled, is started.

During this third step 530, liquid nitrogen at cryogenic temperature is sent 531 into the channel 20 from the production unit 102 via the distribution system 103 at least into the positions of the drill bit 101, the advance of which corresponds to drilling into a metal.

In practice, the knowledge of the assembly to be drilled makes it possible to determine for which penetration depths of the drill bit the cutting edges of the second end of the drill bit are in contact with a metal material.

The position of the drill bit along the direction of advance corresponding to the penetration depth is for example obtained by a signal from a sensor used to activate a valve 105 of the distribution system 103.

The flow of nitrogen transported to the cutting edges 13 is determined in order to maintain a temperature of the drill bit 101 at said cutting edges of below 800° C. when the material drilled is a titanium alloy, the case considered here to be the most constraining, in practice below a temperature for which the diamond of the drill bit could be converted into graphite.

In this case, care will be taken to take into account all the uncertainties of measurement by the sensor(s) and the deviation of the thicknesses of the various materials of the stack to be drilled so that the liquid nitrogen arrives from the start of the drilling of a metal material, preferably at least a short time before the start of the drilling of the metal material, and continues to the end of this drilling, preferably at least a short time after this end of drilling, in order to prevent heating of the drill bit.

In one embodiment, less economic in terms of liquid nitrogen, liquid nitrogen is sent throughout the drilling operation of the stack from the start of the advance to the withdrawal of the drill bit, or at least up to a step 540 in which the advance movement is reversed in order to free the drill bit from the drilling made.

When the drilling operation 500 is finished, the drilling unit is stopped and is separated 550 from the drilled assembly.

Another drilling operation can then be carried out in which the step 510 is not necessarily carried out when the drilling unit 40 is simply moved, for example to another position of the same drilling grid 42, without having been separated from the device 100.

Thus, contrary to the accepted principles for drilling metal materials, in particular titanium alloys, it has been made possible to use a polycrystalline diamond (PCD) tipped drill bit, the temperature of which during the drilling is kept well below temperatures which would have led to the destruction of the tool.

Such a polycrystalline diamond tipped drill bit is very suitable for drilling highly abrasive composite materials, such as carbon fiber composite materials, and consequently the drilling of the stack of various metal and composite materials is carried out in a single pass with the same drill bit.

This possibility results in a significant time saving, estimated at around 40%, over a drilling cycle time.

Moreover, the service life of the drill bit is also increased by a factor of three on average.

The use of a cooling of the drill bit with liquid nitrogen transported as close as possible to the cutting edges, that is to say as close as possible to the creation of thermal energy during the drilling, proves to be much more effective than with known oily lubricants. The service life of the drill bits 101 of the invention are in particular increased by an estimated factor of three under industrial drilling conditions compared to drill bits having a tungsten carbide substrate that are used with oily lubricants for drilling such stacks.

The liquid nitrogen used is an inert substance which presents no problems with respect to the environment, which is not the case for oily lubricants.

The cost of the liquid nitrogen is also much lower than that of the oily lubricants, especially since for the latter is necessary to take into account the costs linked to the reprocessing of the lubricants that have been used.

Liquid nitrogen, besides its chemical inertness, is vaporized almost instantaneously during a drilling operation and the result of this is increased safety for the operators.

In the case of a drill bit 101 comprising a reservoir 23 close to the second end of said drill bit, the reservoir is filled with liquid nitrogen as soon as the liquid nitrogen is sent into the channel 20 and, by remaining supplied with nitrogen, guarantees that the end of the drill bit will be kept at a low temperature by serving as a heat sink. In the event of a momentary rise in temperature, a partial vaporization of the liquid nitrogen will have the effect, on the one hand, of absorbing more thermal energy and of promoting the flow of low-temperature nitrogen through the ejection ducts 22.

The reservoir 23 also acts as a buffer in the event of a momentary interruption in the supply of liquid nitrogen and delays a rise in temperature to a damaging level for the drill bit.

When the channel 20 comprises a thermally insulating coating, a risk of premature vaporization of the nitrogen in the channel and also a risk of external condensation and/or icing of the body 10 are reduced and, by limiting the thermal losses, the cooling is better concentrated in the region of the cutting edges 13.

Another advantage of the device 100 is its safety with respect to the drilled stack.

Indeed, the cost of the parts forming the stack is generally, at the stage of the final assembly thereof, very high, in any case disproportionate with respect to the cost of a drill bit, and damaging the parts at this stage may have significant economic consequences both with respect to the parts themselves and implications regarding the production cycle of the products manufactured.

In the case of the device 100, the drill bit is suitable for dry drilling without the need for cooling in the composite material but requires significant cooling in the metal material. However, a loss of the liquid nitrogen cooling function, for example by running out of the liquid nitrogen or by a breakdown of the distribution system 103, during the drilling of the metal material will result only in the destruction of the tool, which is not suitable in the absence of cooling, without damaging the metal part.

The parts forming the stack in the process of being drilled are therefore protected in the event of failure of the device, at the expense of a drill bit, the cost of which in general remains much lower than that of the parts worked.

The invention claimed is:

1. A drilling method for drilling a stack comprising at least one layer of a metal material comprising titanium and at least one layer of a composite material comprising fibers held in a hardened matrix, the method comprising the steps of:
   drilling the stack in one pass with a drill bit comprising at least one cutting edge formed by an insert made with polycrystalline diamond and attached to a body of the drill bit so as to form the at least one cutting edge; and
   transporting liquid nitrogen at cryogenic temperature and ambient pressure close to said at least one cutting edge in contact with the metal material through a channel passing internally through the body of the drill bit and through at least one ejection duct that opens close to said at least one cutting edge.

2. The drilling method as claimed in claim 1, further comprising the step of transporting the liquid nitrogen simultaneously on a cutting face and on a wear face of said at least one cutting edge.

3. The drilling method as claimed in claim 1, further comprising the step of transporting the liquid nitrogen into the channel as a function of a measured or estimated position of the drill bit with respect to the stack.

4. The drilling method as claimed in claim 1, wherein the metal material of the stack comprises a titanium-based alloy; and further comprising the step of transporting the liquid nitrogen with a flow rate sufficient to keep a temperature of the drill bit below a temperature for converting the polycrystalline diamond into graphite.

5. The drilling method as claimed in claim 1, further comprising:
   insulating the body of the drill bit from the liquid nitrogen within the channel.

* * * * *